(No Model.) 2 Sheets—Sheet 1.
H. SCHAAKE.
FLUXING ATTACHMENT FOR SEAMING MACHINES.
No. 525,625. Patented Sept. 4, 1894.
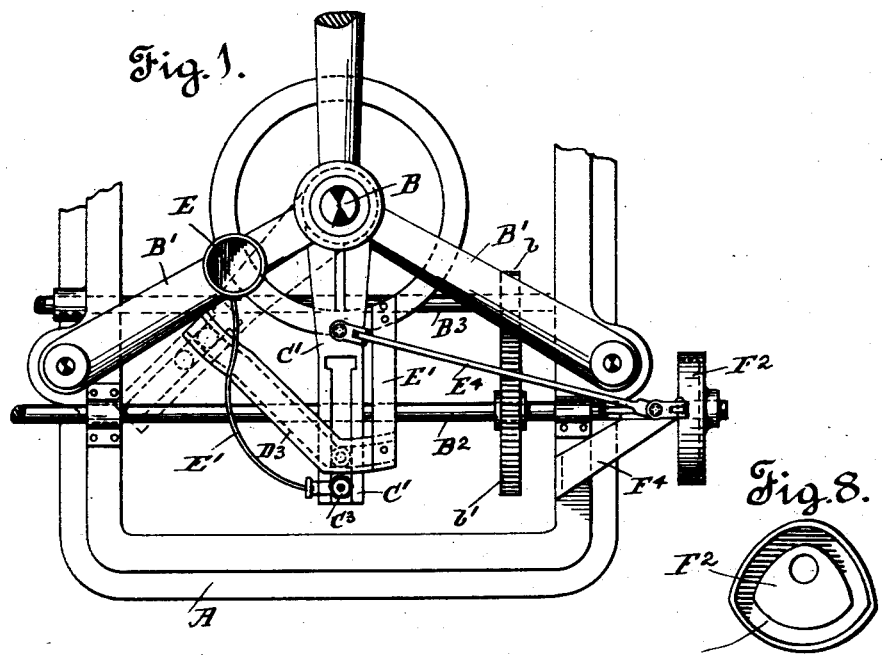
Fig. 1.
Fig. 8.
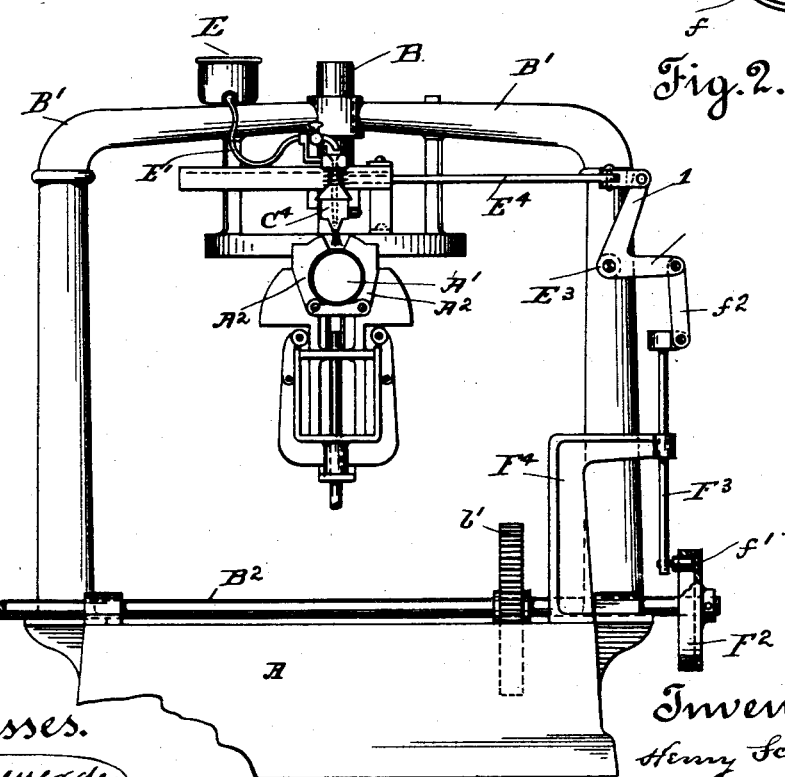
Fig. 2.
Witnesses.
Inventor.
Henry Schaake

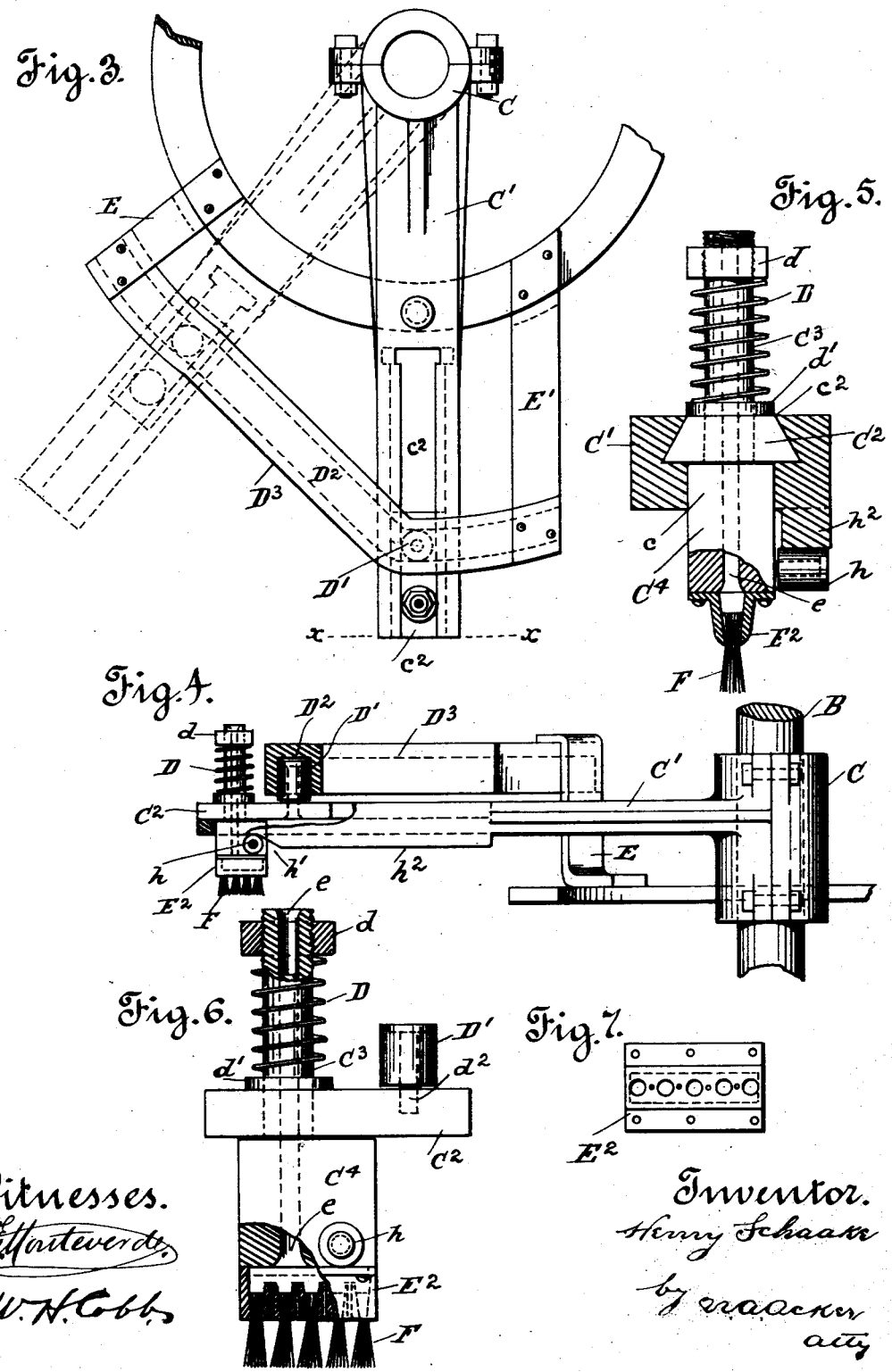

UNITED STATES PATENT OFFICE.

HENRY SCHAAKE, OF SAN FRANCISCO, CALIFORNIA.

FLUXING ATTACHMENT FOR SEAMING-MACHINES.

SPECIFICATION forming part of Letters Patent No. 525,625, dated September 4, 1894.

Application filed August 23, 1893. Serial No. 483,817. (No model.)

*To all whom it may concern:*

Be it known that I, HENRY SCHAAKE, a citizen of the United States, residing at San Francisco, in the county of San Francisco and State of California, have invented certain new and useful Improvements in Fluxing Attachments for Seaming-Machines; and I do hereby declare the following to be a full, clear, and exact description of said invention, such as will enable others skilled in the art to which it most nearly appertains to make, use, and practice the same.

This invention relates to a certain new and useful fluxing attachment for soldering or seaming machines, more especially to that class designed for the seaming of can bodies, and it consists in the arrangement of parts and details of construction as will be hereinafter more fully set forth in the drawings, described and pointed out in the specification.

The object of the present invention is to permit the flux to be supplied to the metal after the body of the can has been formed, but prior to the soldering thereof, so as to insure against the flux being displaced, which does occur where the flux is applied to the sheet metal previous to its being formed into the shape required; to provide for the flux being evenly and uniformly applied to the metal or unsoldered can body; and to so supply the flux as to prevent the same making its appearance upon the inside of the can body when finished.

Referring to the drawings forming a part of this application—Figure 1, is a top plan view showing the fluxing device attached to a seaming machine; Fig. 2, a front elevation of Fig. 1. Fig. 3, is an enlarged detail top plan view of the fluxing device; Fig. 4, a side elevation of Fig. 3. Fig. 5, is a front elevation of the flux-brush and hollow feed frame, the guide bar being in cross section, taken on line $x$—$x$— Fig. 3. Fig. 6, is an enlarged detail view of the flux brush and feed supply therefor; Fig. 7, detail top plan of the perforated brush holder, and Fig. 8, is a detail view of the operating cam.

The letter A, indicates the base or frame of an ordinary can body seaming machine, A' the mandrel thereof, and A² the clamping jaws for forming the sheet metal blank into a can body over the mandrel. The vertical operating shaft B, is maintained in position by the arms B', and rotary motion is imparted to said shaft through the medium of cross shaft B², which is operated by means of shaft B³, by the gear wheel $b$, intermeshing with gear wheel $b'$. All of these features and their workings being well known and forming no part of my invention, call for no specific description herein.

To the upper portion of the rotatable shaft B, is movably secured the sleeve C, from which radially projects the guide arm or rod C', through the outer portion of which is cut the slot $c$, the upper portion of said slot being enlarged as shown at $c^2$, within which enlarged portion fits the wedge-shaped sliding block C². Through this block extends the stem C³, of the feed frame C⁴, which has a forward and backward motion within the slotted portion $c$, of guide arm C', being carried by the movement of the sliding block C². The feed frame has a vertical movement by means of the spring D, which surrounds the stem C³, and is secured between the collars $d$, $d'$, as shown. From the sliding block C², projects the pin $d^2$, which carries the roll D'. This roll works within the groove D², cut or formed in the under face of the bar or plate D³. This plate is fastened to the arms E, E', one of which is shorter than the other, see Fig. 3, consequently the plate D³, runs at an angle to the frame of the machine. As the roll D', travels within the groove D², the sliding block is drawn or moved inward toward the vertical shaft B, and carries the feed frame therewith.

To the seamer, at any convenient point, is secured the flux receptacle or chamber E, which contains a liquid flux, and said chamber is connected to the stem C³, of the feed frame C⁴, by means of the flexible pipe or hose E'. The liquid flux is thus conveyed from the chamber to the stem, whence it enters into passage-way $e$, of the stem and feed frame and is finally discharged upon the perforated top plate of the brush holder.

To the feed frame is secured the brush holder E², which is perforated so as to permit the liquid flux to flow upon the bristles F, secured within the holder, as shown. These bristles constitute the brush for applying the flux to the can body.

An oscillating motion is imparted to the guide arm C', so as to cause it to move in unison with the travel of the vertical shaft B, through the medium of the eccentric cam F², which is secured upon the outer end of shaft B². This cam has a groove $f$, cut therein, within which works the wrist pin $f'$, projecting from the rod F³, which is connected at its upper end with link $f^2$, said link in turn being connected with one arm of the crank lever E³, the other arm of said lever being connected to arm C' by the rod E⁴.

As the rod F³, which works through the bracket F⁴, is raised, arm $l$ of the crank lever is thrown inward which causes the guide arm C', through the medium of the connecting rod E⁴, to move likewise, but in unison with the travel of the seaming mandrels. As the arm C', is carried around, the roll D', of the sliding block C², is caused to travel within the groove at an incline, and it is obvious that the travel of the roll D', within the groove gradually draws the sliding block inward toward the vertical shaft B, which carrying the feed frame therewith, causes the brush to move over the seam of the can body, held between the clamp jaws, and deposits the flux thereon. The brush is brought into contact with the can body by means of the roll $h$, secured to one side of the feed frame, working upon the inclined face $h'$, of track $h^2$, secured to the under face of arm C'. The arm C', continues its rotary travel until the brush has moved its full inward distance toward the vertical shaft B, which carries the fluxing brush beyond the edge of the can body, when the eccentric cam will be in such a position as to impart a quick downward movement to the rod F³, which reverses the motion of the arm C', and forces the sliding block toward the outer end of the arm, thus carrying the fluxing brush outward or away from the vertical shaft B. It will thus be observed that the said brush is carried in or out, the outward movement being somewhat quicker than the inner one, in order to place the brush in position to apply the flux to the next can body.

The fluxing brush when moved its full outward distance is held away or out of contact with the can body by the action of the spring D, but when the arm C' starts to rotate with the shaft B, the roll $h$ engages with the inclined face $h'$, of track $h^2$, and as the arm C' continues its movement the roll $h$ working upon the inclined face $h'$, causes the brush holder to move downward until the flux brush contacts with the can body and the same is held firmly against the body until by its inward movement the brush has traveled over the entire length of the can body seam. Of course as the brush holder is moved downward in order to cause the brush to bear upon the can body, the spring D is compressed.

As the sliding block moves its full outward distance or away from the vertical shaft B, the roll $h$ moves from off the inclined face $h'$, of the track $h^2$, and the resiliency of spring D, raises the feed frame and brush above the level of the can body so as to clear the edge of the can body held between the next set of clamps, in order that the flux may not be scraped off the brush, which would result did the brush on its outward movement contact with the edge of the can body.

It will thus be noticed that by the use of this device the flux is placed upon the metal uniformly, and in such a manner as not to run on the under surface thereof.

Having thus described my invention, what I claim as new, and desire to secure protection in by Letters Patent of the United States, is—

1. In a fluxing apparatus for seaming machines, the combination with the guide arm, of mechanism for imparting an oscillatory motion thereto, fluxing brush carried by said guide arm, device for causing the brush to move to or from the vertical shaft of the seamer with the oscillatory movement of the guide arm, and the fluxing chamber for supplying the flux to the brush.

2. In a fluxing apparatus for seaming machines, the combination with the guide arm, of mechanism for imparting an oscillatory motion thereto, the fluxing brush carried by the arm, devices for moving the brush to or from the vertical shaft of the seamer with the movement of the guide arm and causing the same to bear upon or raise from the can body, and the fluxing chamber for supplying the flux to the brush.

3. In a fluxing apparatus for seaming machines, the combination with the spring actuated fluxing brush, of mechanism for imparting a reciprocating motion thereto, and devices for imparting a vertical movement to the fluxing brush, whereby the same is caused to bear upon or raise from the can body carried by the seamer.

4. In a fluxing apparatus for seaming machines, the combination with the spring actuated fluxing brush, mechanism for imparting a reciprocating motion thereto, the flux chamber, of the flexible hose or tube for conveying the flux from the chamber to the brush, and devices for imparting a vertical movement to the fluxing brush, whereby the same is caused to move to or from the can body carried by the seamer.

5. In a fluxing apparatus for seaming machines, the combination with the guide arm, mechanism for imparting an oscillatory motion thereto, the sliding block working within the arm, a feed frame carried thereby, the fluxing brush connected thereto and a device for reciprocating the sliding block.

6. In a fluxing apparatus for seaming machines, the combination with the guide arm, mechanism for imparting an oscillatory motion thereto, the sliding block working within the arm, the inclined groove plate, a roll carried by the plate for imparting a reciprocating motion to the block with the movement of the guide arm, the feed frame, having a tubular stem, carried by the slide block, a perforated brush holder, carrying a flux brush, attached to the feed frame, a flux receptacle or chamber and a flexible connection between said chamber and the feed frame.

7. In a fluxing apparatus for seaming machines, the combination with the guide arm, the sliding block, the feed frame carrying a brush holder, a device for imparting a reciprocating motion to the sliding block, the operating cam, crank lever, connecting rod between the lever and cam, and the rod forming connection between the crank lever and guide arm, in order to impart an oscillatory motion to the arm with the movement of the cam.

8. In a fluxing apparatus for seaming machines, the combination with the swinging guide arm, an inclined grooved plate, a device carried by the swinging guide arm connected with the inclined plate so that with the movement of the guide arm a reciprocating motion will be imparted thereto, the fluxing brush carried thereby, and of mechanism for imparting motion to the guide arm.

In testimony whereof I affix my signature in presence of two witnesses.

HENRY SCHAAKE.

Witnesses:
W. A. ACKER,
LEE D. CRAIG.